United States Patent [19]
Hardesty et al.

[11] Patent Number: 5,842,259
[45] Date of Patent: Dec. 1, 1998

[54] CNC MACHINE TOOL AND TOOLHEAD ASSEMBLY THEREFOR

[75] Inventors: Michael P. Hardesty, Dale; David A. Stutsman, Huntingburg; Edwin H. Haefling, Evanston; Robert A. Hardy, Gentryville, all of Ind.

[73] Assignee: Thermwood Corporation, Dale, Ind.

[21] Appl. No.: 701,315

[22] Filed: Aug. 21, 1996

[51] Int. Cl.⁶ .................................................. B23B 29/32
[52] U.S. Cl. ............................................ 29/48.5 A; 29/40
[58] Field of Search ............................ 29/38–40, 48.5 A, 29/48.5 R, 38 A, 38 B, 38 C, 36; 409/217, 202, 212

[56] References Cited

U.S. PATENT DOCUMENTS

| | | | |
|---|---|---|---|
| 3,617,141 | 11/1971 | Sullivan | 29/40 X |
| 3,830,584 | 8/1974 | Ohlig et al. | 29/40 X |
| 4,054,975 | 10/1977 | Lundstrom | 29/36 X |
| 4,593,731 | 6/1986 | Tanaka | 407/217 X |
| 4,887,345 | 12/1989 | Saito et al. | 29/40 X |
| 4,922,595 | 5/1990 | Hattori et al. | 29/40 |
| 5,421,072 | 6/1995 | Kuban | 29/38 A |

FOREIGN PATENT DOCUMENTS

1757782  8/1992  U.S.S.R. ........................................ 29/40

*Primary Examiner*—William R. Briggs
*Attorney, Agent, or Firm*—Lalos & Keegan

[57] ABSTRACT

The invention provides a machine tool comprising a base member, a workpiece support means mounted on the base member, a toolhead support means mounted on the base member, a toolhead assembly mounted on the toolhead support means, rotatable about a given axis relative to the toolhead support means, at least two tools mounted on the toolhead assembly, having axes radially disposed and circumferentially spaced relative to the given axis, a means for operating a selected one of the tools when the selected tool is disposed in a predetermined position relative to the workpiece support means operatively interconnecting the toolhead support means and the toolhead assembly for selectively, rotatably indexing the toolhead assembly about the given axis to position a selected one of the tools in the predetermined position; and means for locking the toolhead assembly relative to the toolhead support means when a selected one of the tools is disposed in the predetermined position.

69 Claims, 9 Drawing Sheets

CNC MACHINE TOOL AND TOOLHEAD ASSEMBLY THEREFOR

This is invention relates to CNC machine tools and more particularly to a machine tool having improved versatility and productivity. The invention further contemplates an improved toolhead assembly for such a machine.

BACKGROUND OF THE INVENTION

In CNC machine tools used in performing various machining operations on workpieces formed of wood, plastic or nonferrous metals, there basically is provided a base member, a table mounted on the base member which may be either stationary or displaceable along a longitudinal or y-axis, a gantry mounted on the base member which may be stationary or displaceable along such y-axis, a toolhead support assembly mounted on the gantry, displaceable transversely or along an x-axis and a toolhead assembly mounted on the toolhead support assembly and displaceable along a vertical or z-axis. The various components of such a machine are displaced along several lines of travel or axes by servomotors operated by a programmable controller.

Over the years, in an effort to increase versatility and productivity, such machines have been modified to provide various forms of improved tooling features such as automatic tool changers, "piggyback" type toolhead assemblies utilizing an additional tool spindle operated by the main tool spindle drive and multiple toolhead assemblies. While such forms of toolhead assemblies have provided for improved versatility and productivity, they also have had certain attendant disadvantages. While an automatic tool changer provides greater versatility, it still requires a number of motions of the toolhead assembly in maneuvering which has the effect of reducing cycle time. While a "piggyback" type of assembly is quicker to operate and less costly than automatic tool changers, it is limited with respect to the number of tools available for performing different work functions. With regard to multiple toolhead assemblies, while such arrangements provide greater versatility and productivity, they have the disadvantage of being comparatively costly and incapable of being positioned at all points of the machine table due to the presence of multiple assemblies which restrict their degree of movement.

It thus has been found to be desirable to provide a type of machine as described which not only improves upon the versatility and production of similar prior art machines but which overcomes the several disadvantages attendant to prior art toolhead assemblies.

SUMMARY OF THE INVENTION

The present invention overcomes the various disadvantages of prior art toolhead assemblies by providing a machine of the type described having a tool assembly generally consisting of a support means mountable on the machine tool, a housing mounted on the support means rotatable about a given axis relative to the support means, a plurality of tools mounted on the housing, having axes radially disposed and circumferentially spaced relative to the given axis, means connectable to power sources of the machine for selectively operating each of the tools when each selected tool is disposed in a predetermined position relative to the support means, means operatively interconnecting the support means and housing for selectively, rotatably indexing the housing about the given axis to position a selected one of the tools in the predetermined position, and means for locking the housing relative to the support means when a selected one of the tools is disposed in the predetermined position.

The tools mounted on the housing may be either pneumatically or electrically operated or a combination thereof. The means for selectively operating such tools includes means for communicating a source of air under pressure with each pneumatically actuated tool when such tool is disposed in the predetermined position, and electrical contact means which engage when each of the electrically operated tools is disposed in the predetermined position. Means further are provided for identifying the type of tool disposed in the predetermined position so that the appropriate mode of motive force corresponding to the particular tool disposed in the predetermined position may be supplied.

The locking means for such assembly includes an extendable pin disposed in one of the support means and the housing, and a pin receiving opening in the other of the support means and the housing, registrable with the extendable pin when a selected tool is disposed in the predetermined position. Preferably, the extendable pin includes a tapered end portion engageable with a side wall portion of an opening in which it is received for camming the tool into the predetermined position under conditions where the selected tool may not be precisely positioned in the predetermined position.

The indexing means for the housing of the assembly preferably includes a roller bearing having an inner race rigidly secured to the support means and an outer race rigidly secured to the housing supporting the various tools. The housing is rotatably indexed relative to the support means by means of a motor having a pinion disposed in frictional drive relationship with the outer race of such bearing. The frictional drive not only prevents the transmission of loads back through the gear reduction train of the indexing motor but further permits the camming action of the locking pin as it is extended into a registrable opening in the outer race of the bearing under such conditions when the selected tool is not precisely positioned in the predetermined position for performing a work function.

Other objects and advantages of the present invention will become more apparent to those persons having ordinary skill in the art to which the present invention pertains from the following description taken in conjunction with the accompanying drawings.

Description of the Preferred Embodiment

Figure 1:
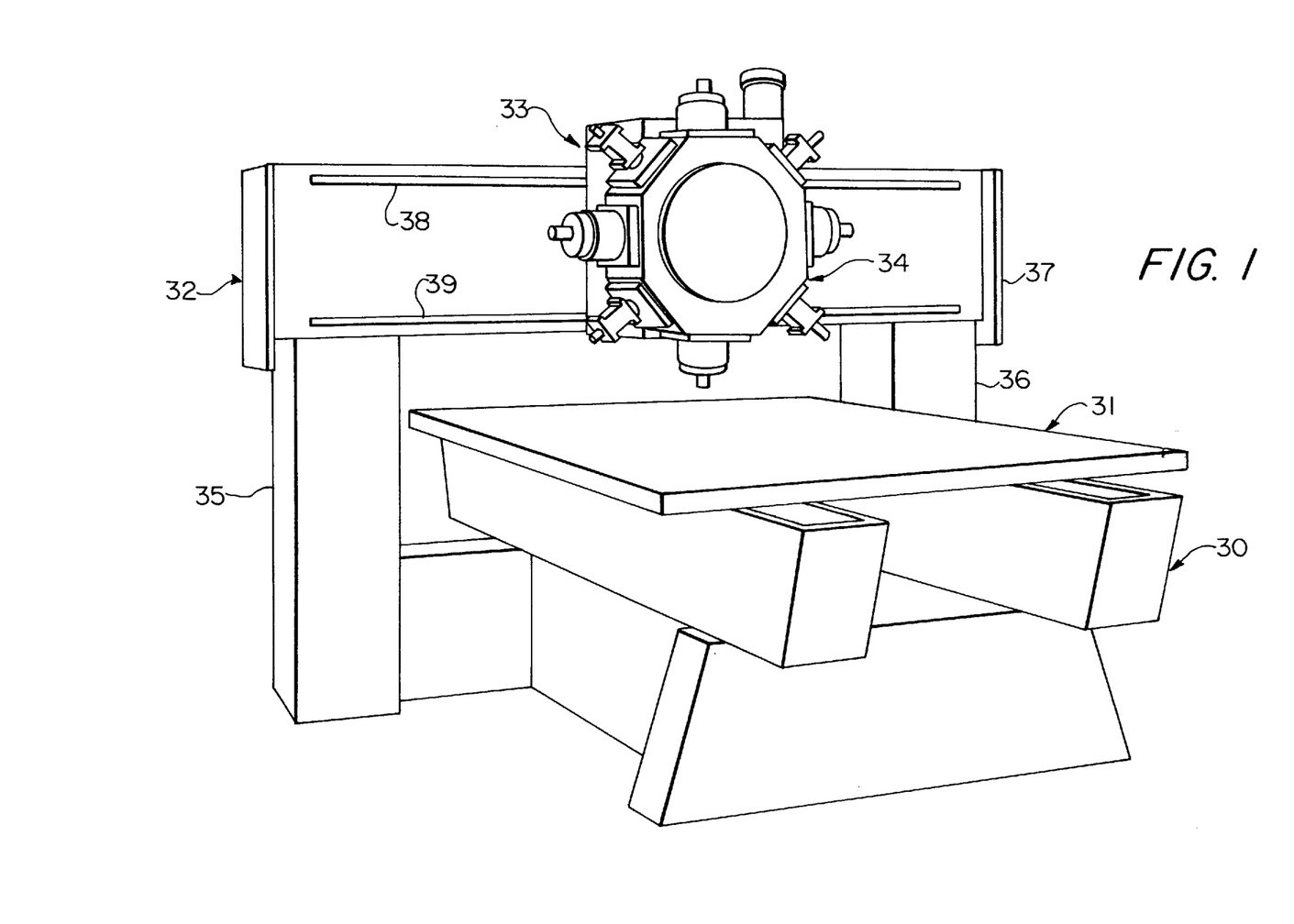
FIG. 1 is a perspective view of a CNC machine tool embodying the present invention.

Referring to the drawings, there is illustrated an embodiment of the invention which generally includes a base member 30, a worktable 31, a gantry 32, a toolhead support assembly 33 and a toolhead assembly 34. The base member is formed of steel sections welded together to provide a rigid end stable foundation. Worktable 31 is mounted horizontally on the base member and is adapted to be displaced longitudinally relative to the base member or along a y-axis. Gantry 32 includes a pair of leg members 35 and 36 rigidly secured at their lower ends to the base member, and a transversely disposed section 37 supported on the leg sections and spanning above the worktable. The front face of transverse section 37 is provided with a pair of vertically spaced, transversely disposed rails 38 and 39 on which toolhead support assembly 33 is mounted and displaceable transversely or along an x-axis. Toolhead assembly 34 is mounted on the toolhead support assembly is adapted to be displaced vertically or along a z-axis. Each of worktable 31, toolhead support assembly 33 and toolhead assembly 34 is displaceable along its respective axis by a feedscrew arrangement driven by an AC servomotor. The operation of such servomotors is controlled by a programmable controller to provide for the movement of a tool mounted on the toolhead assembly along a motion path to perform a work function such as routing, shaping, drilling, sanding and the like on a workpiece mounted on the worktable. Instead of the worktable being displaceable and the gantry being stationary as described, the worktable can be stationary and the gantry may be displaceable along the y-axis to provide the displacement between the gantry and the worktable.

Toolhead Support Assembly

Figure 2:
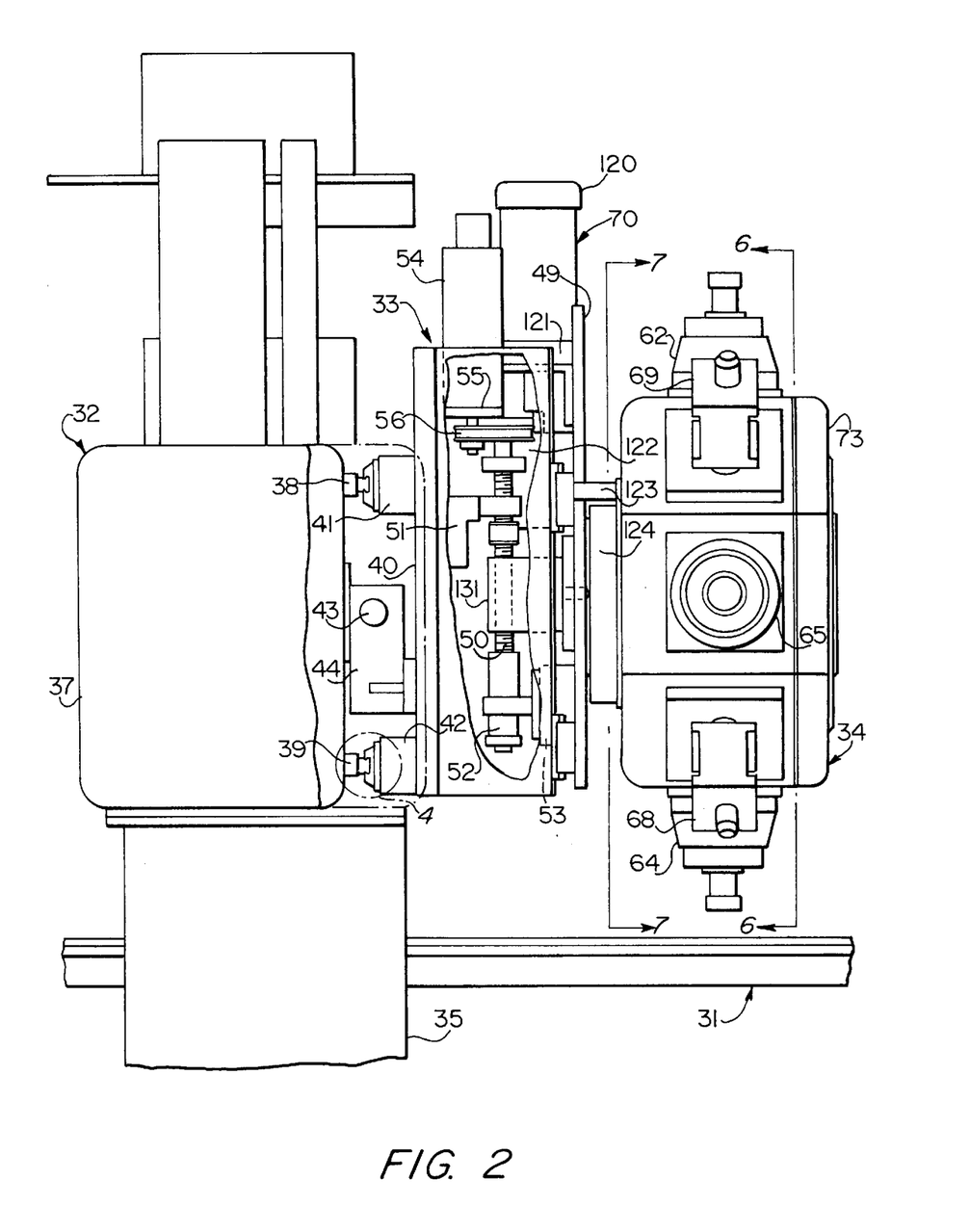
FIG. 2 is an enlarged, side elevational view of the machine shown in FIG. 1, illustrating the toolhead assembly thereof and having portions thereof broken away.
Figure 3:
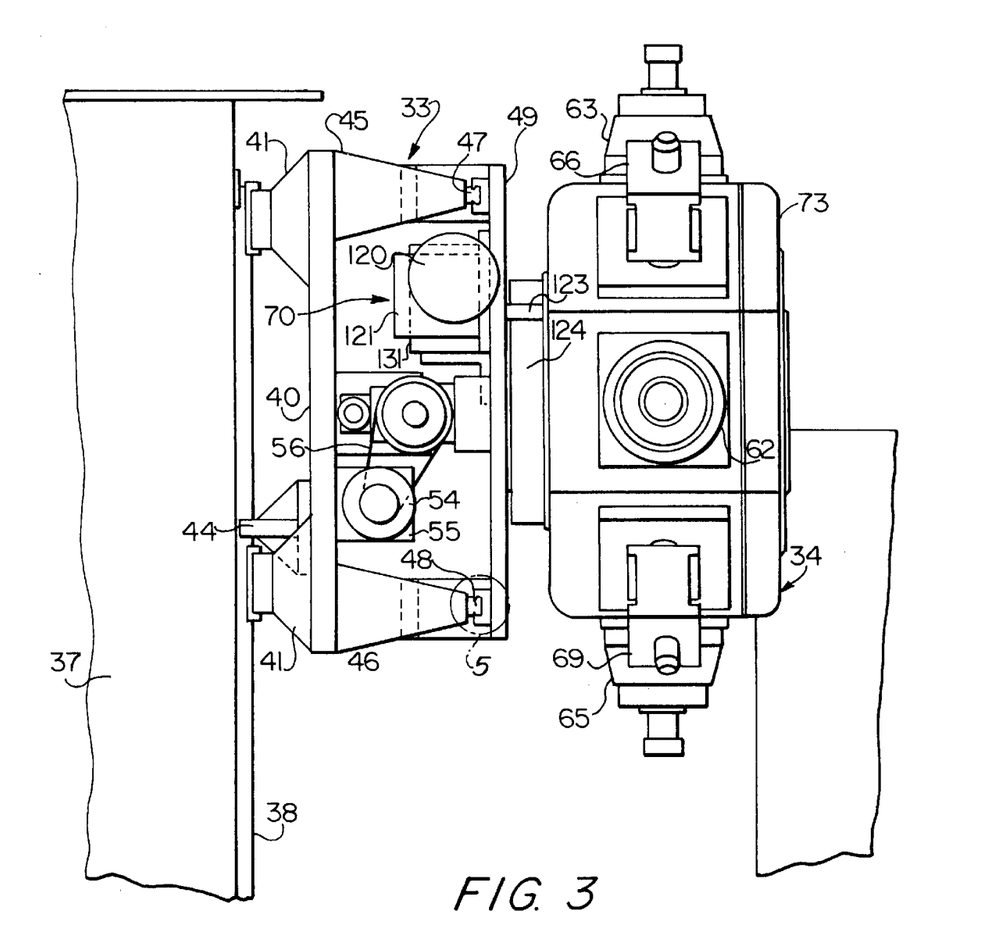
FIG. 3 is a top plan view of the portion of the machine shown in FIG. 2.
Figure 4:
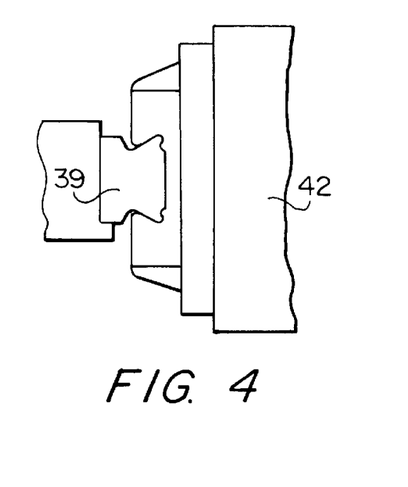
FIG. 4 is an enlargement of the rail construction designated in FIG. 3.
Figure 5:
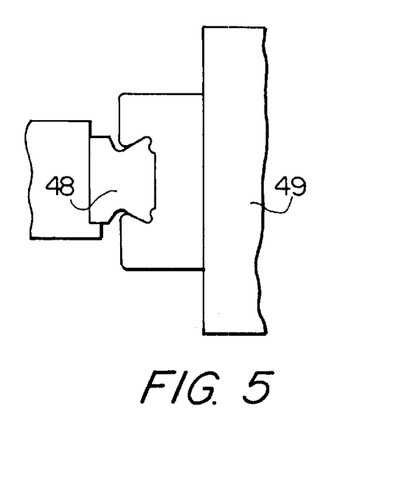
FIG. 5 is an enlargement of the rail construction designated in FIG. 3.

As best shown in FIGS. 2 and 3, the toolhead support assembly is provided with a rearwardly disposed support plate 40 which is provided with a set of upper, rearwardly projecting brackets 41, 41 slidably mounted on upper rail 38, and a set of lower, rearwardly projecting brackets 42, 42 slidably mounted on lower rail 39 for guiding the toolhead support assembly on rails 38 and 39 along the transverse or x-axis. Such displacement is provided by a feedscrew 43 journaled in bearings provided on transverse gantry section 37, driven by a servomotor and cooperating with a follower 44 secured to the rear side of support plate 40. Secured to and projecting forwardly from support plate 40 is a pair of transversely spaced brackets 45 and 46, provided at their forward ends with a pair of transversely spaced, vertically disposed rails 47 and 48. Mounted on rails 47 and 48 is a mounting plate 49 on which the toolhead assembly is mounted and which is displaceable vertically or along an x-axis relative to the toolhead support assembly.

Displacement of the toolhead assembly relative to the toolhead support assembly vertically or along the z-axis is provided by a vertically disposed feedscrew 50 journaled in a bracket 51 mounted on support plate 40, and cooperating with a follower member 52 rigidly secured to mounting plate 49 by means of a bracket 53. Feedscrew 50 is driven by a motor 54 mounted on a bracket 55 secured to support panel 40, through a pulley assembly 56. It will be appreciated that as the drive motor 54 is operated, the feed screw will cooperate with follower member 52 to cause the toolhead assembly to displace relative to the toolhead support assembly, guided along rails 47 and 48.

Toolhead Assembly

Figures 6, 15A, 15B, 15C, 15D, 15E:
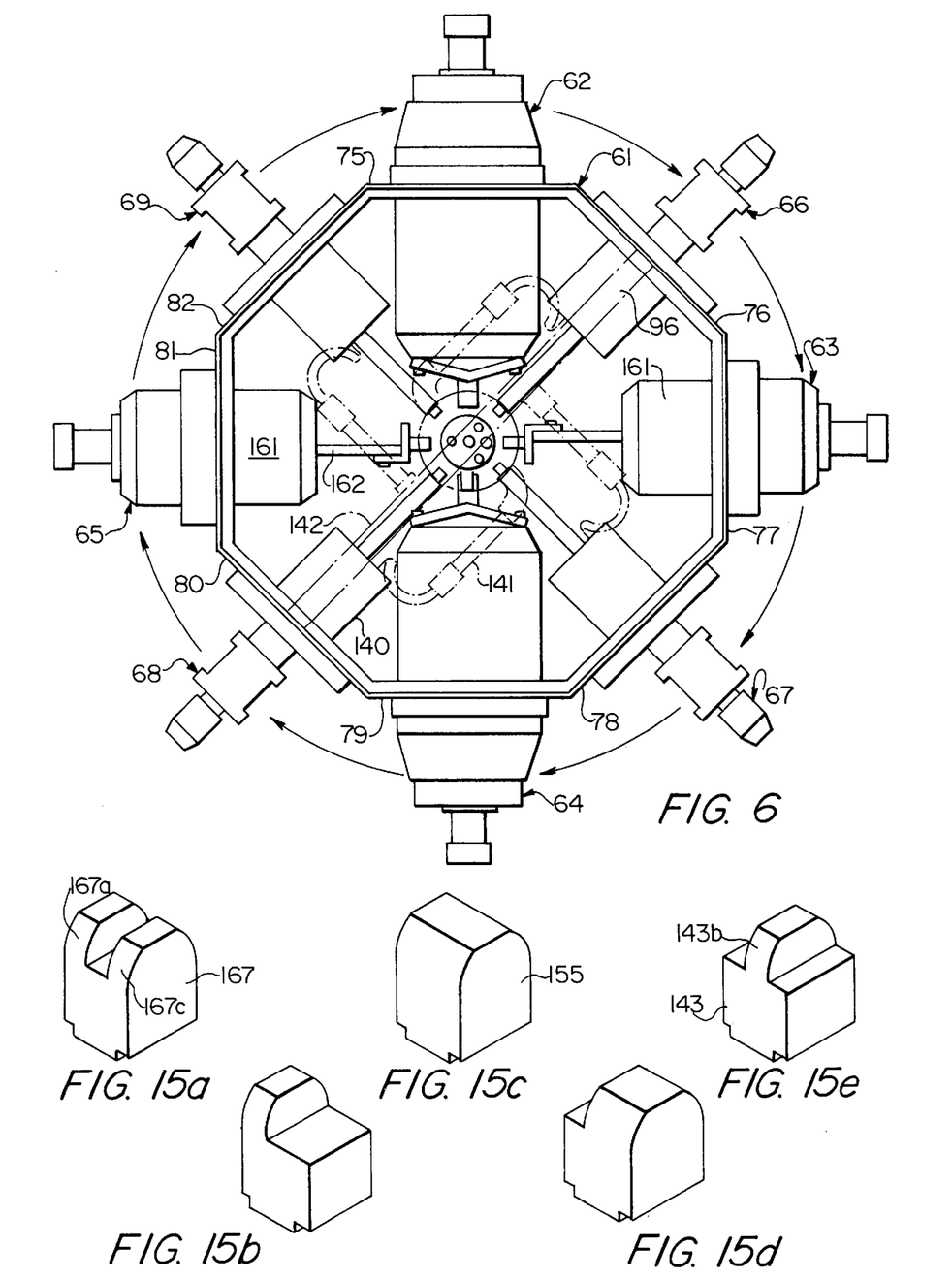
FIG. 6 is an enlarged cross-sectional view taken along line 6—6 in FIG. 2.
FIGS. 15a through 15e are enlarged, trip elements cooperable with the trip switch shown in FIG. 15.
Figures 7, 8, 10:
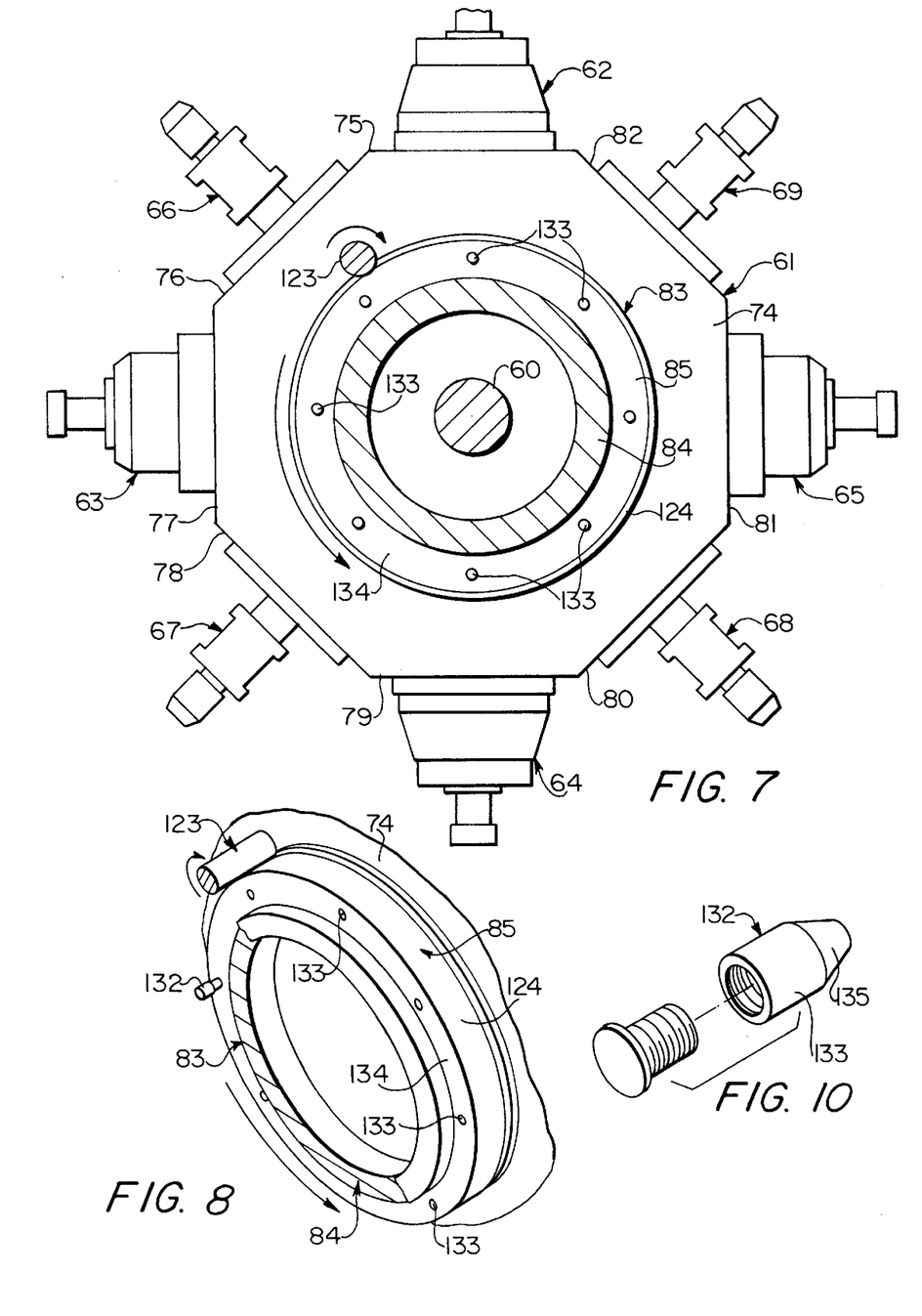
FIG. 7 is an enlarged cross-sectional view taken along line 7—7 in FIG. 2.
FIG. 8 is a perspective view of the inner side of the toolhead assembly shown in FIG. 2, having portions thereof broken away.
FIG. 10 is a perspective view of the locking pin shown in FIGS. 8 and 9.

Referring to FIGS. 6 through 12 of the drawings, toolhead assembly 34 generally includes a power supply rod 60 secured at one end to support plate 49, a housing or turret 61 supported on support plate 49 for rotational movement about the axis of power supply rod 60, a first set of electrically powered tools 62 through 65 and a set of pneumatically powered tools 66 through 69 mounted on housing 61 with the spindle axes thereof disposed radially and circumferentially spaced relative to the axis of the power supply rod, a rotary indexing assembly 70 (FIGS. 2 and 3), a pin locking assembly 71 and a tool identification assembly 72. Housing 61 consists of a pair of octagonally configured front and rear walls 73 and 74, and a plurality of side wall sections 75 through 82. The housing is mounted concentrically relative to the axis of the power supply rod and is rotatably supported on mounting plate 49 by means of a roller bearing 83, as best shown in FIGS. 7 and 8. The inner race 84 of the roller bearing is rigidly connected to support plate 49 and the outer bearing 85 thereof is rigidly secured to rear wall 74 of the housing. It will be appreciated that upon rotation of outer race 85 of roller bearing 83, housing 61 will be caused to rotate relative to mounting plate 49 about the axis of the power supply rod.

Power Supply Rod

The function of power supply rod 60 is to provide an electrical power connection to each of the electrically powered tools 62 through 65 as each of such tools is indexed to a lower operative position as shown by electrically powered tool 64 in FIG. 6, provide a connection of each pneumatically powered tool 66 through 69 to a source of air under pressure as each such tool is indexed to the lower operative position, and further identify by means of assembly 72 the particular tool disposed in the operative position to allow the controller to supply the appropriate type of power for operating the tool disposed in the operative position. The rod is formed of a sturdy metal, having the inner end thereof rigidly secured to mounting plate 49. Electrical power for the 3-phase, AC motor of each of the electrically powered tools is provided through knife-type electrical contacts. Such contacts include three sets of stationary clip contacts 86, 87 and 88 supported on and depending from an intermediate portion of the power supply rod, and a cooperating set of blade contacts mounted on each electrically powered tool which are adapted to engage the clip contacts when the tool is positioned below the power supply rod in the operative position. The stationary clip contacts are provided with electrical lead lines which extend through a passageway in the power supply rod and are operatively connected to the power supply of the machine, and each set of movable blade contacts is connected to the windings of the respective tool motor, in the conventional manner.

Figure 11:
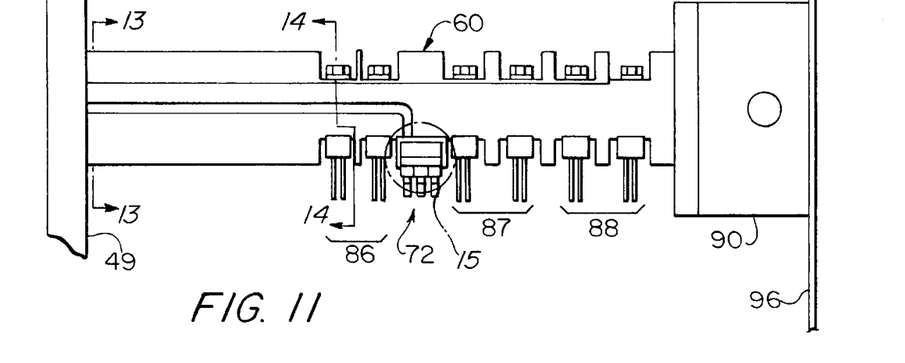
FIG. 11 is an enlarged, side elevational view of a power supply rod used in the toolhead assembly shown in FIGS. 2, 3, 6 and 7.
Figures 12, 13, 14, 15:
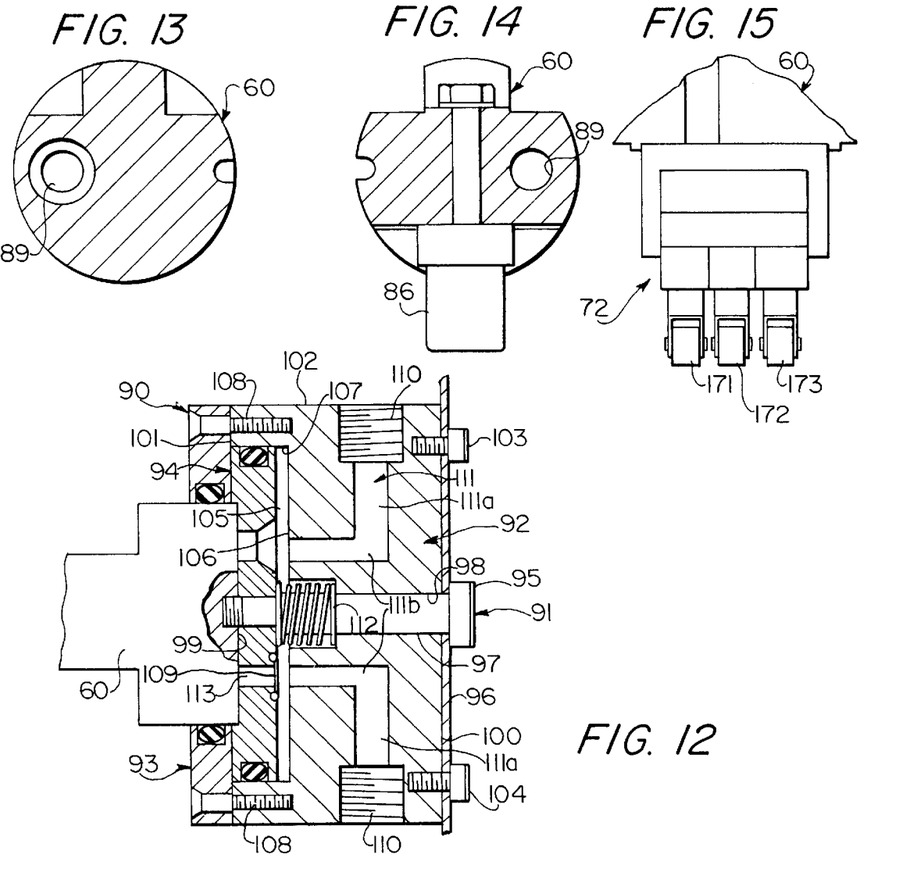
FIG. 12 is an enlarged, vertical cross-sectional view of the rotary union mounted on the free end of the power supply rod shown in FIG. 11.
FIG. 13 is an enlarged, cross-sectional view taken along line 13—13 in FIG. 11.
FIG. 14 is an enlarged, cross-sectional view taken along line 14–14 in FIG. 11.
FIG. 15 is an enlarged view of the trip switch designated in FIG. 11.

Air under pressure for operating each of the pneumatically powered tools 66 through 69 disposed in the operative position is supplied from a source on the machine, through a passageway 89 in the power supply rod, as best shown in FIGS. 13 and 14, and a rotary union assembly 90 mounted on the outer end of the power supply rod. As best seen in FIGS. 11 and 12, rotary union assembly 90 includes a support pin 91, a cylindrical block member 92, an annular end cap 93 and an annular valve plate 94. Support pin 91 is disposed coaxially with the power supply rod and includes a head portion 95 engaging an outer side of a diametrically disposed member 96 connected at its ends to opposed side wall sections of the housing, and a shank portion 97 extending through an axially disposed opening 98 in the block member and having the end thereof threaded into an end wall 99 provided with an outlet port of air passageway 89. Block member 92 includes an outer circular wall 100, an inner circular wall 101 and a cylindrical outer wall 102. Outer wall 100 is secured to diametrically disposed member 96 by means of a set of screws 103 and 104 thus causing block member 92 to rotate with the housing relative to power supply rod 60 and support pin 91 about the common axis of the power supply rod and support pin 91. Inner end wall 101 is provided with a recess 105 having a cylindrical bottom wall 106 and a cylindrical side wall 107. Annular end cap member 93 is secured to end surface 101 of the block member by means of a set of screws 108 to engage an annular wall of the power supply rod and thus close recess 105 to form an annular chamber 109 in which annular valve plate 94 is disposed.

Cylindrical block member 92 further is provided with a plurality of threaded ports 110 in cylindrical wall 102 which are circumferentially spaced 90° apart relative to the center line of support pin 91. Each of such ports communicates with chamber 109 by means of a passageway 111 having a radially disposed segment 111a and a segment 111b disposed equidistantly from and parallel to the axis of support pin 91. Each of ports 110 is connected to a motor of one of pneumatically powered tools 66 through 69 by means of a flexible air hose.

Annular valve plate 94 is urged into engagement with end wall 99 of the power supply rod to block the outlet port of air supply passageway 89, by means of a helical retaining spring 112 interposed between a shoulder provided on the shank portion of support pin 91 and an outer end wall of the annular valve plate. As best shown in FIG. 12, a lower portion of annular valve plate 94 is provided with a passageway 113 which is radially displaced and parallel relative to the axis of support pin 91, and which further is adapted to be aligned with a segment 111b of a passageway 111 communicating with a lowermost, vertically disposed outlet port 110.

During the rotational indexing of the turret to reposition the tools thereon, annular valve plate 94 will remain stationary with power supply rod 60 and support pin 91, urged against end wall 99 of the power supply rod under the biasing action of spring 112 to block the outlet port of air supply passageway 89, and cylindrical block member 92 secured to member 96 and annular end cap member 93 secured to the cylindrical block member will rotationally index with the housing about the common axis of the power supply rod and support pin 91. Under such conditions, there would be no air under pressure supplied to any of passageways 111, and annular valve plate 94 will be out of engagement with cylindrical block member 92 thus preventing any interference with the freely rotational indexing movement of the housing or any wear between any engaging surfaces of the annular valve plate and the cylindrical block member.

When an air powered tool is indexed to the lower, operational position and such condition is signalled to the controller by the tool identification assembly, air under pressure is supplied to passageway 89 which causes it to bear against annular valve plate 94 and displace it axially against the biasing action of retaining spring 112. Under such conditions, air under pressure will flow through the space formed between end surface 99 of the power supply rod and the displaced annular valve plate, passageway 113 and registered passageway 111 communicating with the lowermost outlet 110 to operate the pneumatically powered tool disposed in the operative position. When the operation of the tool has been completed and the supply of pressurized air to passageway 89 has been discontinued, retaining spring 112 will then extend to axially displace the annular valve plate in the position as shown in FIG. 12, blocking the outlet of air passageway 89 and permitting the cylindrical block member and the housing to freely rotate to position the next tool.

Rotary Indexing Assembly

Rotary indexing assembly 70 is best illustrated in FIGS. 2 and 3. It consists of a drive motor 120 mounted on a bracket 121 secured to the inner side of support plate 49, having a downwardly projecting shaft operatively connected to a gear reduction unit 122 also mounted on the inner side of support plate 49. Operatively connected to an output shaft of the gear reduction unit is a pinion 123 extending through an opening in the support plate, and engageable with an outer cylindrical surface 124 of outer race 85 of roller bearing 83, in frictional drive relationship. The end portion of pinion 123 is provided with a layer of a compressible, friction material such as polyurethane which causes the pinion to sufficiently engage cylindrical surface 124 of the outer race of bearing 83 to transmit rotary motion through frictional contact.

Figures 9, 16, 17:
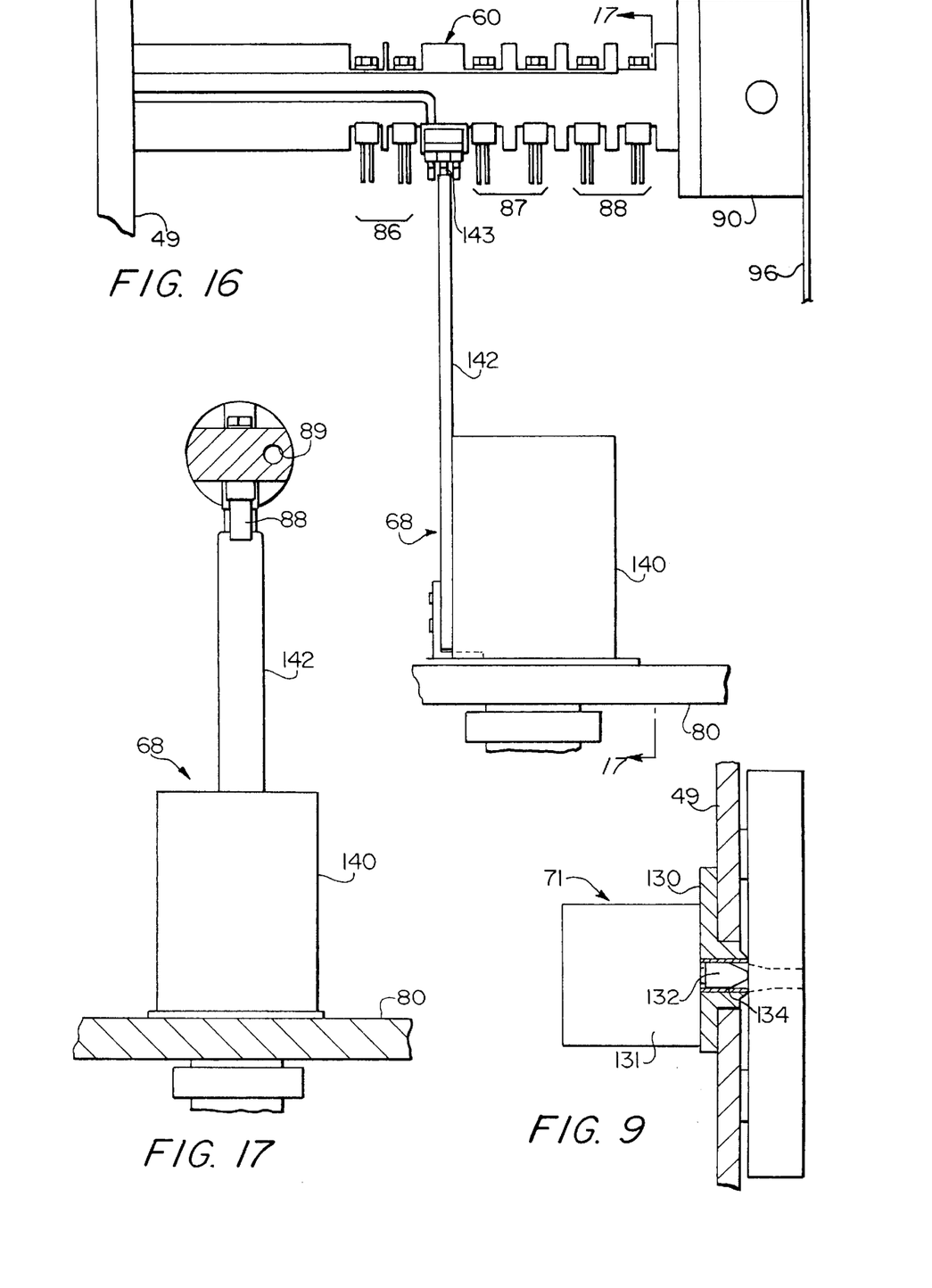
FIG. 9 is an enlarged, vertical cross-sectional view of the locking pin assembly shown in FIGS. 2 and 3.
FIG. 16 is a view similar to the view shown in FIG. 11, illustrating a pneumatically powered tool supported on the housing of the toolhead assembly, in an operative position.
FIG. 17 is a cross-sectional view taken along line 17—17 in FIG. 16.

In the operation of assembly 70 for indexing the toolhead assembly and positioning a selected tool in the operative position, the controller of the machine functions to operate drive motor 120 and provide an output drive in a selected direction which is transmitted through the gear reduction unit and pinion 123 to outer race 124 and thus correspondingly rotationally index the selected tool on the toolhead assembly to or closely to the operative position. In the event the selected tool intended to be indexed to the operative position is not precisely located in such position, locking pin assembly 71 as shown in FIG. 9 functions to cam the outer race portion of roller bearing 83 so that the selected tool is nudged into the precise operating position. Any reactive or other force transmitted back through the outer race of the bearing will be prevented from being transmitted to pinion 123 and the gear reduction unit by the ability of the bearing outer race to slip relative to the pinion, thus preventing any possible damage to any gear reduction unit components.

Pin Locking Assembly

The precise positioning of a selected tool of the turret assembly in the operative position and a locking of the toolhead assembly relative to support plate 49 is provided by pin locking assembly 71. Such assembly is best shown in FIGS. 7 through 10 and consists of a bracket 130 mounted on an inner side of support plate 49 and having a hub portion thereof extending through an opening in the support plate, a pneumatically actuated cylinder assembly 131 mounted on bracket 130 and having an output shaft extendable through an opening in the hub portion of bracket 130, and a locking pin 132 mounted on the end of the extendable rod of assembly 131 which is adapted to be disposed within the hub portion of bracket 130 when the extendable rod of assembly 131 is in a retracted position, as shown in FIG. 9, and be disposed within an opening 133 disposed in an outer face 134 of bearing outer race 85 when one of such openings registers with the locking pin and the rod portion of cylinder 131 is extended, as shown in FIG. 8. Pin receiving openings 133 are circumferentially spaced on outer face 134 of the bearing outer race, and each of such openings is adapted to register with the locking pin when a tool is positioned in the operative position.

Referring to FIG. 7, it will be noted that when tool 64 is located at or near the operative position as shown, the opening displaced 90°, in a clockwise direction, will be positioned at or near registry with the locking pin. If such opening is precisely registered with the locking pin, the rod portion of cylinder 131 will merely extend will merely extend to freely insert the locking pin into the registered opening to lock the toolhead assembly relative to support plate 49. If such opening is slightly displaced from precise registry with the locking pin, the extension of the rod portion of the cylinder will cause the locking pin to cam the outer race causing it to rotationally index slightly and thus cause the pin receiving opening to register precisely with the locking pin and correspondingly to cause the selected tool to be positioned in the precise operating position.

As best shown in FIG. 10, locking pin 132 includes a cylindrical main body portion 133 which rides in a bushing 134 disposed in the opening of the hub portion of bracket 130, and a tapered end portion 135. Preferably, each of pin receiving openings 133 is provided with an outer, tapered wall portion engageable by tapered portion 135 of the locking pin to facilitate the camming action of the pin upon the pin being inserted into a partially registered opening.

To provide an effective and smooth functioning of the locking assembly, a greater force is applied in retracting the locking pin than the force applied in extending the pin. As an example, air pressure of about 40 psi is provided to the base end of cylinder assembly 131 for extending the locking pin and air pressure of about 90 psi is provided to the rod end of cylinder assembly 131 for retracting the locking pin. The greater retracting force assures that the locking pin will not become wedged or jammed in a registered pin receiving opening thus interfering with the indexing operation of the toolhead assembly.

In the operation of the locking pin assembly, whenever the rotary indexing assembly is operated to position a tool at or near the precise operative position of the tool, the controller will function to actuate cylinder assembly 131 causing the rod portion thereof to extend and thus insert the locking pin into a pin receiving opening 133 disposed at or near precise registry with the locking pin. If the pin receiving opening is precisely registered, the locking pin will easily be inserted into the registered opening to lock the toolhead assembly relative to support plate 49. If such pin receiving opening is not precisely registered with the locking pin, resulting in the selected tool not being properly located in the precise operative position, the insertion of the locking pin into the nearly registrable pin receiving opening will cause the pin to cam the outer bearing race and thus nudge the toolhead assembly and correspondingly rotate the selected tool in the precise operative position. When the work function of the tool disposed in the operative position has been completed and another tool is to be indexed into the operative position, the controller of the machine will function to cause cylinder assembly 131 to retract the rod portion thereof and thus withdraw the locking pin from the pin receiving opening in the bearing outer race to free the toolhead assembly.

Tool Assemblies

FIGS. 16 and 17 illustrate pneumatically operated tool 68 disposed in the operative position. The tool includes an air motor 140 mounted on an inner side of side wall section 80 of housing 61, having a portion thereof including an output shaft extending through an opening in side wall section 80 and having a tool bit removably attached on an end portion thereof, an air supply hose 141 connected to a lowermost disposed outlet opening 110 in rotary union assembly 90 and an arm member 142 disposed radially relative to the axis of the power supply rod and having a trip element 143 disposed on the free end thereof which is adapted to trip a depressible switch element of assembly 72 and thus identify for the controller that tool 68 is disposed in the operative position as will later be more fully explained.

When tool 68 is in the operative position as shown in FIGS. 16 and 17, the computer will operate to cause air under pressure to be supplied to fluid passageway 89 thus causing annular valve plate 94 of assembly 90 to displace against the biasing action of retaining spring 112, and flow through the space between end face 99 of rod 60 and annular valve plate 94, passageway 113 registered with segment 111*b* of passageway 111, passageway 111 and air hose 141 to operate air motor 140. When the work function of tool 68 has been completed, the controller will operate to discontinue the supply of air under pressure to passageway 89 thus causing annular valve member 94 to displace and close the outlet port of passageway 89, under the biasing action of retainer spring 112.

Figure 18:
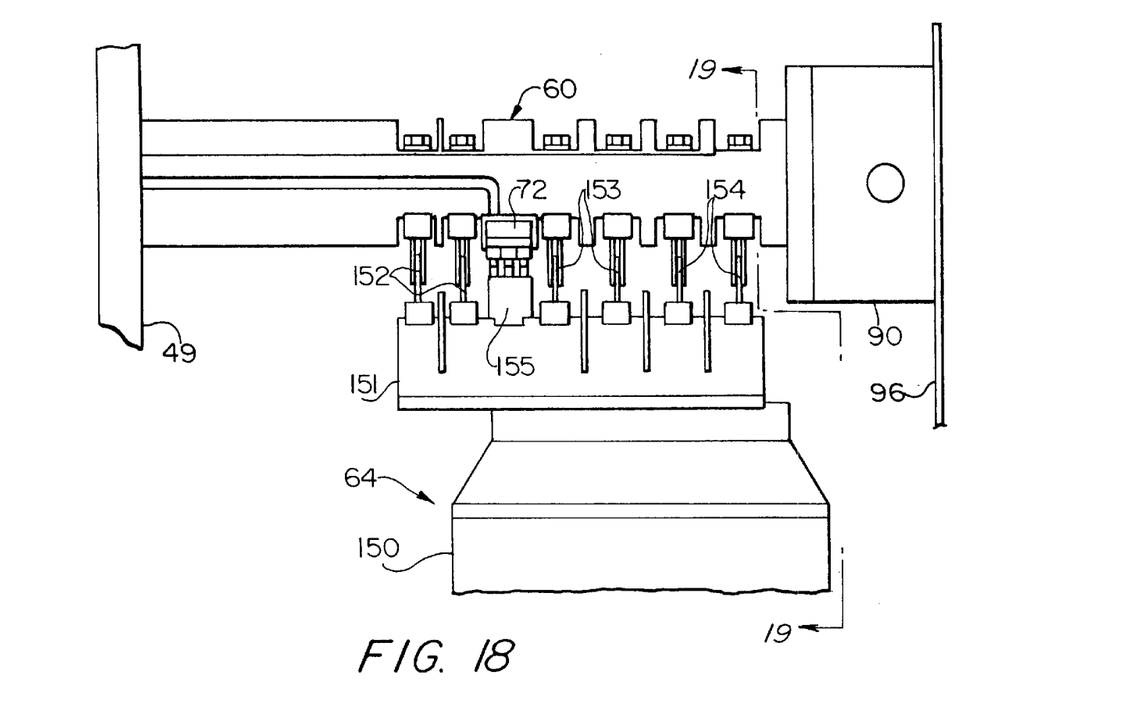
FIG. 18 is a view similar to the view shown in FIG. 16, illustrating an electrically powered tool in an operative position.
Figure 19:
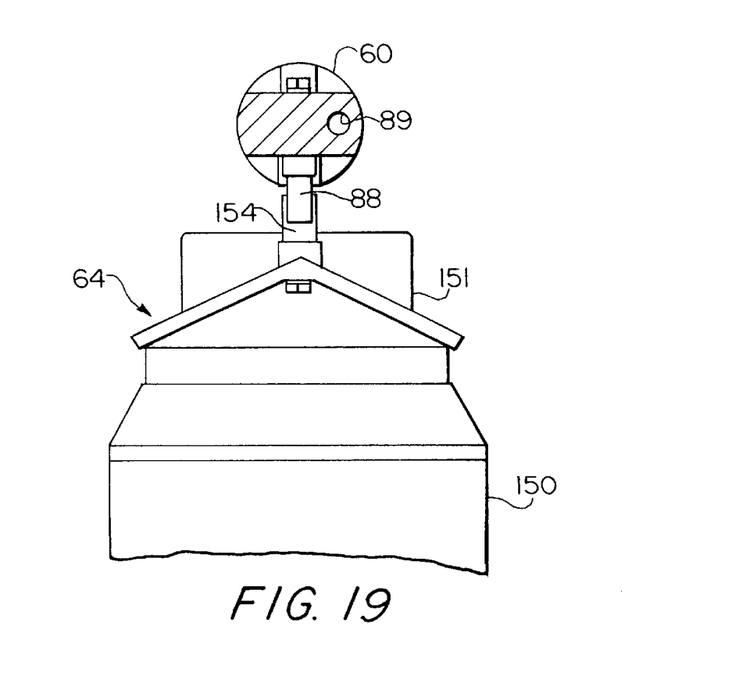
FIG. 19 is a cross-sectional view taken along line 19—19 in FIG. 18.

FIGS. 18 and 19 illustrate electrically powered tool 64 disposed in the operative position. The tool includes a 3-phase, 9 H.P., AC motor 150 mounted on side wall section 79 of the housing having a portion thereof with an output shaft extending through an opening in side wall section 79, on which a tool bit may be removably attached, and a bracket 151 secured to the base end of motor 150 which is adapted to be disposed substantially radially relative to the axis of the power supply rod and adjacent the sets of electrical contact clips 86, 87 and 88. Provided on bracket 151 and electrically connected to the windings of motor 150 are sets 152, 153 and 154 of electrical contact blades which engage sets of electrical contact clips 86, 87 and 88, respectively, in electrical contact to provide electrical power to motor 150. When blade sets 152, 153 and 154 engage electrical clips sets 86, 87 and 88, a trip element 155 mounted on bracket 151 will be disposed in relationship to assembly 72 for identifying tool 64 as the tool located in the operative position.

With tool 64 positioned in the operative position as shown in FIGS. 18 and 19, the tool identification assembly will signal the controller of the type of tool to be powered. Accordingly, the controller will operate to supply the appropriate voltage through the knife-type contacts to energize and thus operate tool 64.

Figures 20, 21:
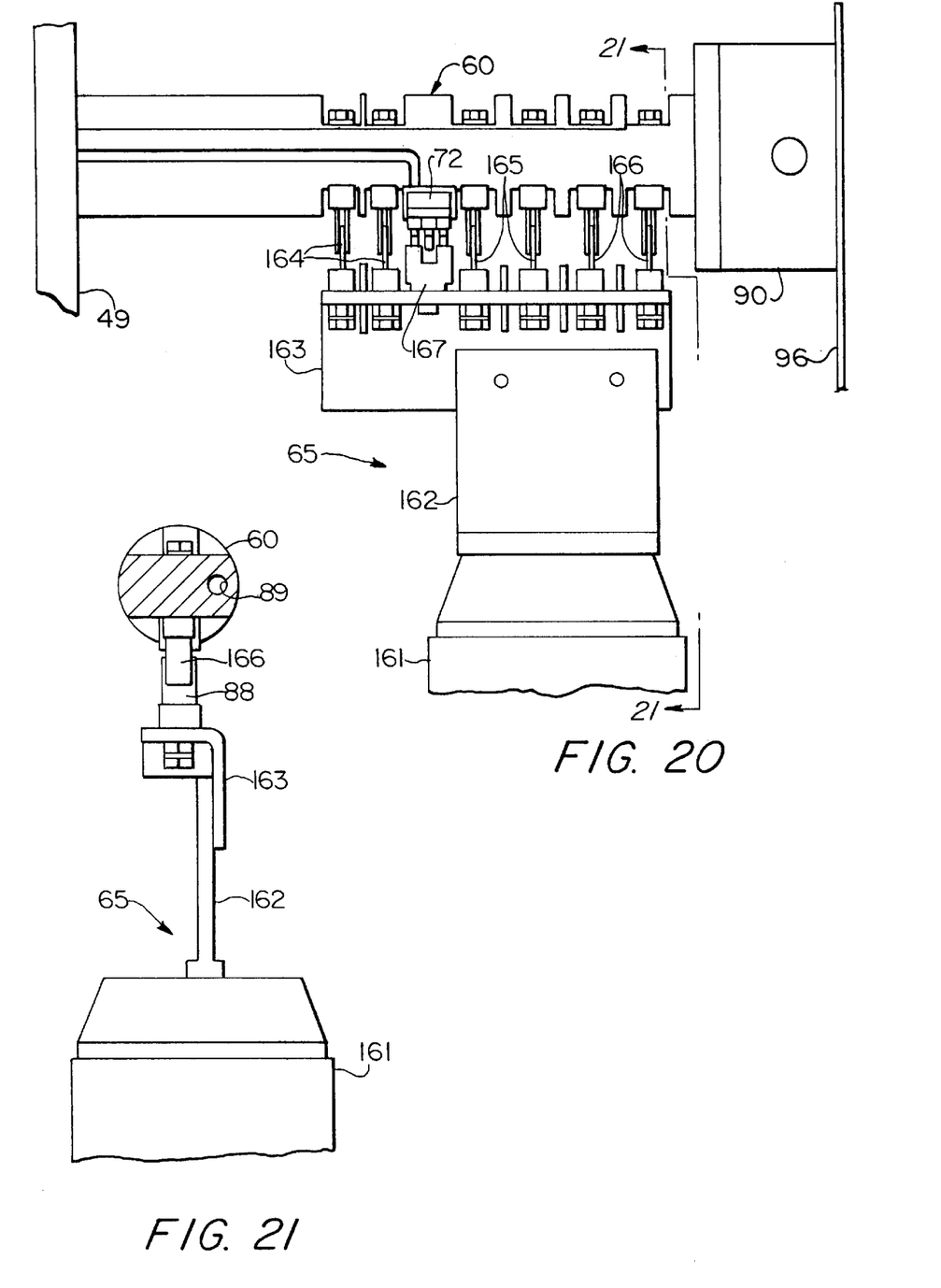
FIG. 20 is a view similar to the view shown in FIG. 18, illustrating another electrically powered tool in the operating position.
FIG. 21 is a cross-sectional view taken along line 21—21 in FIG. 20.

FIGS. 20 and 21 illustrate electrically powered tool 65 disposed in the operative position to be energized and perform a work function on a workpiece positioned on the worktable of the machine. Tool 65 is generally similar to electrically powered tool 64 and is adapted to be electrically connected to the electrical contact clips on the power supply rod in a manner similar to electrically powered tool 64. The tool includes a 3-phase, 4 H.P. AC motor 161 mounted on side wall section 81 of the housing and having an outer portion thereof extending through an opening in the side wall. The base end of the motor includes a bracket 162 disposed radially relative to the axis of the power supply rod. Mounted on an angle shaped member 163 secured to the free end of bracket 162 are sets of electrical blade contacts 164, 165 and 166 which engage electrical contact clips 86, 87 and 88, respectively, to provide an electrical connection of motor 161 with the electrical supply on the machine.

Electrically powered tool 65 is connected to the electrical power supply of the machine in the same manner as electrically powered tool 64 when tool 65 is disposed in the operative position as shown in FIGS. 20 and 21, with the electrical blade contacts thereof engaging the electrical clip contacts provided on the power supply rod. The identification of electrically powered tool 65 for the controller is provided by a trip element 167 which engages and trips certain switch elements of tool identification assembly 72 when electrically powered tool 65 is positioned in the operative position. Upon identification of tool 65 being positioned in the operative position, the controller will function to apply electrical current of an appropriate voltage to electrical motor 161 through the electrical knife connections. Once electrically powered tool 63 is rotatably indexed out of the operative position as shown in FIGS. 20 and 21, the controller further will function to discontinue the supply of electrical current for motor 161.

Electrically powered tools 62 and 63 are configured and are electrically energized similar to electrically powered tools 64 and 65, as described. Similarly, air powered tools 66, 67 and 69 are constructed and are connected with a source of air under pressure similar to air powered tool 68, as described. In this latter regard, it will be appreciated that each of air powered tools 66, 67 and 69 will be connected by means of a flexible air hose to an outlet port 110 of rotary union assembly 90 and will be caused to be powered when such tool is disposed in the operative position and the controller operates to supply air under pressure to passageway 89 in the power supply rod.

Various types of tool bits may be mounted on the various electrical and air powered tools as described such as routers, drills, shapers, sanders and the like, as desired.

Tool Identification Assembly

Tool identification assembly 72 shown in FIG. 15 essentially consists of an electrical switch having a set of downwardly biased elements 171, 172 and 173. Such elements may be depressed in different configurations to generate different identification signals to the controller. The switch elements are adapted to be engaged and depressed in various combinations by the trip elements of different configurations shown in FIGS. 15a through 15e, mounted on the electrical and air powered tools, to identify the particular tool disposed in the operative position to be supplied with a motive force. As an example, trip element 167 of electrically powered tool 65, having a raised portion 167a in a first sector thereof, a void portion in a second sector thereof and a raised portion 167c in a third sector thereof will be adapted to engage and depress switch elements 171 and 173 to close two sets of contacts and energize two circuits noting the presence of electrically powered tool 65 in the operative position. Trip element 155, mounted on electrically powered tool 64 and having no voids in any of the three sectors thereof, will engage all three switch elements 171, 172 and 173 to depress the same, causing three sets of contacts to close and energizing three separate circuits noting the presence of electrically power tool 64 in the operative position. Trip element 143 provided on air powered tool 68 and having voids in the first and third sectors and a raised portion 143b in the second sector is adapted to engage and depress only switch element 172 to close a single pair of contacts and energize a single circuit denoting the presence of air powered tool 68 in the operative position. Other tools mounted on the housing are provided with similar trip elements, each having a different configuration engageable with switch elements 171, 172 and 173 in different combinations to similarly close different sets of contacts and energize different combinations of circuits to denote the particular electrical or air powered tool disposed in the operative position.

Operation

In the operation of the machine as described, one or more workpieces to be machined are properly positioned on workpiece support table 31 and a program providing for a sequence of tool selection and the path and feed rate of each tool is inputted into the controller of the machine. When the controller then begins to execute the program, it functions to operate servomotor 70 to rotationally index the housing or turret 61 and thus position a selected tool such as electrically powered tool 64 in the operative position as shown in FIGS. 2, 6, 7, 18 and 19 to begin a first machining operation. When the housing or turret is thus oriented, an opening 133 in the bearing outer race 85 will either fully or partly register with locking pin 123. The controller then functions to apply air under pressure to the base end of cylinder assembly 131 to extend locking pin 123 into the fully or partially registered opening 133. In the event the opening is only partially registered with the locking pin, denoting a slight displacement of electrically powered tool 64 from the operative position, the engagement of tapered portion 135 of the locking pin with a side wall portion of the opening will cam the housing and thus displace the electrically powered tool 64 precisely to the operative position.

As tool 64 indexes to the operative position, sets of blade contacts 152, 153 and 154 will engage electrical contact clips 86, 87 and 88, respectively, and trip element 155 will depress all three switch elements of assembly 72 to identify the presence of tool 64 in the operative position. Upon notification of the presence of such tool, the controller will function to provide the appropriate power supply for operating the motor of tool 64. Then, in continuing to execute the program, the controller will function to operate the various servomotors of the machine to cause the tool bit of the tool disposed in the operative position to displace relative to the workpiece and thus perform a work function prescribed for such tool in accordance with the program.

When the program may call for the use of an air powered tool such as tool 68, the controller will function to cause air under pressure to be supplied to the rod end of cylinder assembly 131 to retract locking pin 132 and permit housing 61 to freely rotate, and cause drive motor 70 to be energized and thus cause housing 61 to index to position air powered tool 68 in the operative position. Cylinder assembly 131 is then again operated to insert the locking pin in a fully or partially registered opening 133 to accurately position the tool and lock toolhead assembly to support plate 49. As tool 68 is indexed into the operative position, trip element 143 will cause switch element 172 to depress and close a set of contacts, energizing a circuit and identifying for the controller the tool disposed in the operative position. Under such circumstances, the controller will function to provide a supply of air under pressure through passageway 89 in the power supply rod to displace annular valve plate 94 in the rotary union assembly and flow through communicating passageways 113 and 111 to operate air motor 140. The controller will then continue to function to operate the various servomotors for each of the axes of the machine to continue to execute the program.

In continuing to execute the program, the operation as described is repeated to position other electrical and air powered tools mounted on the housing in the operative position to perform subsequent machining functions. Each time the housing is to be indexed, the locking pin is retracted and extended in the manner described to not only precisely position the selected tool in the operative position but also to lock the toolhead assembly relative to the support plate thereof. In circumstances where reactive and other loads are applied to the housing which normally would be transmitted through the pinion to the gear reduction unit, such load transmission is prevented as a result of the capability of the bearing outer race to slip relative to drive pinion 123.

The machine as described not only provides a greater versatility of operation by reason of the number of different tools available but also an improved productivity in providing fast cycle times in changing tools. Furthermore, the machine as described is advantageous in that it requires a minimal operator involvement other than loading and unloading workpieces.

From the foregoing detailed description, it will be evident that there are a number of changes, adaptations and modifications of the present invention which come within the province of those having ordinary skill in the art to which the aforementioned invention pertains. However, it is intended that all such variations not departing from the spirit of the invention be considered as within the scope thereof as limited solely by the appended claims.

We claim:

1. A machine tool comprising:

a base member;

a workpiece support means mounted on said base member;

a toolhead support means mounted on said base member;

a toolhead assembly mounted on said toolhead support means, rotatable about a given axis relative to said toolhead support means;

at least two tools mounted on said toolhead assembly, having axes radially disposed and circumferentially spaced relative to said given axis;

means for operating a selected one of said tools when said selected tool is disposed in a predetermined position relative to said workpiece support means;

means operatively interconnecting said toolhead support means and said toolhead assembly for selectively, rotatably indexing said toolhead assembly about said given axis to position a selected one of said tools in said predetermined position;

means for locking said toolhead assembly relative to said toolhead support means when a selected one of said tools is disposed in said predetermined position; and a roller bearing having an inner race rigidly secured to said toolhead support means and an outer race rigidly secured to said toolhead assembly;

wherein said locking means includes an extendible pin disposed in said toolhead support means and a pin receiving opening in said bearing outer race, registrable with said extendible pin when said tool is disposed in said predetermined position.

2. A machine tool according to claim 1 wherein said base member and said workpiece support means are displaceable relative to each other along a longitudinal or y-axis.

3. A machine tool according to claim 1 wherein said toolhead support means and said base member are displaceable relative to each other along a transverse or x-axis.

4. A machine tool according to claim 1 wherein said toolhead support means and said base member are displaceable relative to each other along a vertical or z-axis.

5. A machine tool according to claim 1 wherein said toolhead assembly and said workpiece support means are displaceable relative to each other along a longitudinal or y-axis, a transverse or x-axis and a vertical or z-axis.

6. A machine tool according to claim 1 wherein at least one of said tools is electrically powered, and wherein said means for operating a selected one of said tools includes electrical contact means which engage when said electrically powered tool is disposed in said predetermined position.

7. A machine tool according to claim 1 wherein at least one of said tools is pneumatically powered, and wherein said means for operating a selected one of said tools includes means for communicating a source of air under pressure with said pneumatically powered tool when said tool is disposed in said predetermined position.

8. A machine tool according to claim 1 including means for identifying a tool disposed in said predetermined position, and wherein said means for operating a selected one of said tools is operable to supply a motive force corresponding to the tool disposed in said predetermined position responsive to a predetermined signal derived from said identifying means.

9. A machine tool according to claim 1 wherein said locking means includes an extendible pin disposed in one of said toolhead support means and said toolhead assembly, and a pin receiving opening in the other of said toolhead support means and said toolhead assembly, registrable with said extendible pin when said tool is disposed in said predetermined position, and means for selectively extending and retracting said extendible pin into and out of a registrable opening.

10. A machine tool according to claim 9 wherein said extendible pin includes a tapered end portion engageable with a side wall portion of said opening for camming said tool into said predetermined position under conditions where said tool may not be precisely positioned in said predetermined position.

11. A machine tool according to claim 9 wherein said rotatably indexing means includes a friction drive.

12. A machine tool according to claim 11 wherein said extendible pin includes a tapered end portion engageable with a side wall portion of said opening for camming said tool into said predetermined position under conditions where said tool may not be precisely positioned in said predetermined position.

13. A machine tool comprising:

a base member;

a workpiece support means mounted on said base member;

a toolhead support means mounted on said base member;

a toolhead assembly mounted on said toolhead support means, rotatable about a given axis relative to said toolhead support means;

at least two tools mounted on said toolhead assembly, having axes radially disposed and circumferentially spaced relative to said given axes;

means for operating a selected one of said tools when said selected tool is disposed in a predetermined operative position relative to said workpiece support means;

means operatively interconnecting said toolhead support means and said toolhead assembly for selectively, rotatably indexing said toolhead assembly about said given axes to position a selected one of said tools in said predetermined operative position;

means for identifying a tool disposed in said predetermined operative position, said means for operating a selected one of said tools being operable to supply power corresponding to the tool disposed in said predetermined operative position responsive to a predetermined signal derived from said identifying means; and a roller bearing having an inner race rigidly secured to said toolhead support means and an outer race rigidly secured to said toolhead assembly;

wherein said locking means includes an extendible pin disposed in said toolhead support means and a pin receiving opening in said bearing outer race, registrable with said extendible pin when said tool is disposed in said predetermined position.

14. A machine tool according to claim 1 wherein said extendible pin includes a tapered end position engageable with a side wall portion of said opening for camming said tool into said predetermined position under conditions where said tool may not be precisely positioned in said predetermined position.

15. A machine tool according to claim 1 wherein said rotatably indexing means includes a pinion engaging said bearing outer race in frictional drive relation.

16. A machine tool assembly according to claim 15 wherein said pinion is provided with an outer layer of frictional material drivingly engageable with said bearing outer race.

17. A machine tool according to claim 16 wherein said outer race is formed of a metal and said outer layer of frictional material drivingly engageable with said outer race comprises a polyurethane material.

18. A machine tool according to claim 15 wherein said extendible tool includes a tapered end portion engageable with a side wall portion of said opening for camming said tool into said predetermined position under conditions where said tool may not be precisely positioned in said predetermined position.

19. A machine tool according to claim 9 wherein said opening includes a tapered side wall portion and said extendible pin includes a tapered end portion engageable with said tapered side wall portion of said opening for camming said tool into said predetermined position under conditions where said tool may not be precisely positioned in said predetermined position.

20. A machine tool according to claim 9 wherein said extending and retracting means is operable to provide a greater retracting force than extending force.

21. A machine tool according to claim 9 wherein said extending and retracting means comprises a pneumatically actuated cylinder assembly.

22. A toolhead assembly mountable on a machine tool comprising:

a support means mountable on said machine tool;

a housing mounted on said support means rotatable about a given axis relative to said support means;

at least two tools mounted on said housing, having axes radially disposed and circumferentially spaced relative to said given axes;

means connectable to power sources for operating a selected one of said tools when said selected tool is disposed in a predetermined position relative to said support means;

means operatively interconnecting said support means and said housing for selectively, rotatably indexing said housing about said given axis to position a selected one of said tools in said predetermined position;

means for locking said housing relative to said support means when a selected one of said tools is disposed in said predetermined position; and a roller bearing having an inner race rigidly secured to said support means and an outer race rigidly secured to said housing;

wherein said locking means includes an extendible pin disposed on said support means and a pin receiving opening disposed in said outer race, registrable with said extendible pin when said tool is disposed in said predetermined position.

23. A machine tool according to claim 22 wherein at least one of said tools is electrically powered, and wherein said means for selectively operating each of said tools includes electrical contact means which engage when said electrically actuated tool is disposed in said predetermined position.

24. A toolhead assembly according to claim 22 wherein at least one of said tools is pneumatically operated, and wherein said means for operating a selected one of said tools includes means for communicating a source of air under pressure with said pneumatically powered tool when said tool is disposed in said predetermined position.

25. A toolhead assembly according to claim 22 including means for identifying a tool disposed in said predetermined position, and wherein said means for operating a selected one of said tools is operable to supply a mode of motive force corresponding to the tool disposed in said predetermined position responsive to a signal derived from said identifying means.

26. A toolhead assembly according to claim 22 wherein said locking means includes an extendible pin disposed in one of said support means and said housing, and a pin receiving opening in the other of said support means and said housing, registrable with said extendible pin when said tool is disposed in said predetermined position, and means for selectively extending and retracting said extendible pin into and out of a registered opening.

27. A tool assembly according to claim 26 wherein said extendible pin includes a tapered end portion engageable with a side wall portion of said opening for camming said tool into said predetermined position under conditions where said tool may not be precisely positioned in said predetermined position.

28. A tool assembly according to claim 26 wherein said rotatably indexing means includes a friction drive.

29. A toolhead assembly according to claim 28 wherein said extendible pin includes a tapered end portion engageable with a side wall portion of said opening for camming said tool into said predetermined position under conditions where said tool may not be precisely positioned in said predetermined position.

30. A machine tool comprising:

a base member;

a workpiece support means mounted on said base member;

a toolhead support means mounted on said base member;

a toolhead assembly mounted on said toolhead support means, rotatable about a given axis relative to said toolhead support means;

at least two tools mounted on said toolhead assembly having axes radially disposed and circumferentially spaced relative to said given axes;

means for operating a selected one of said tools wherein said selected tool is disposed in a predetermined position relative to said workpiece means;

means operatively interconnecting said toolhead support assembly and said toolhead assembly for selectively, rotatably indexing said toolhead assembly about said given axes to position a selected one of said tools in said predetermined operative position, including a cylindrical surface provided on said toolhead assembly and a drive pinion mounted on said toolhead support means and frictionally engaged with said cylindrical surface of said toolhead assembly for transmitting rotational drive from said pinion to said toolhead assembly; and a roller bearing having an inner race rigidly secured to said toolhead support means and an outer race rigidly secured to said toolhead assembly;

wherein said locking means includes an extendible pin disposed in said toolhead support means and a pin receiving opening in said bearing outer race, registrable with said extendible pin when said tool is disposed in said predetermined position.

31. A toolhead assembly according to claim 22 wherein said extendible pin includes a tapered end portion engageable with a side wall portion of said opening for camming said tool into said predetermined position under conditions where said tool may not be precisely positioned in said predetermined position.

32. A toolhead assembly according to claim 22 wherein said rotatably indexing means includes a pinion engaging said bearing outer race in frictional drive relation.

33. A toolhead assembly according to claim 32 wherein said pinion is provided with an outer layer of frictional material drivingly engageable with said outer race.

34. A toolhead assembly according to claim 33 wherein said outer race is formed of a metal and said outer layer of frictional material drivingly engageable with said outer race comprises a polyurethane material.

35. A toolhead assembly according to claim 32 wherein said extendible tool includes a tapered end portion engageable with a side wall portion of said opening for camming said tool into said predetermined position under conditions where said tool may not be precisely positioned in said predetermined position.

36. A toolhead assembly according to claim 26 wherein said opening includes a tapered side wall portion and said extendible pin includes a tapered end portion engageable with said tapered side wall portion of said opening for camming said tool into said predetermined position under conditions where said tool may not be precisely positioned in said predetermined position.

37. A toolhead assembly according to claim 26 wherein said extending and retracting means is operable to provide a greater retracting force than extending force.

38. A toolhead assembly according to claim 26 wherein said extending and retracting means comprises a pneumatically actuated cylinder assembly.

39. A machine tool comprising:

a base member;

workpiece support means mounted on said base member;

toolhead support means mounted on said base members;

a toolhead assembly mounted on said toolhead support means, rotatable about a given axis relative to said toolhead support means;

at least two tools mounted said toolhead assembly, having axes radially disposed and circumferentially spaced relative to said given axis, at least one of said tools being electrically powered;

means for operating a selected one of said tools when said selected tool is disposed in a predetermined operative position relative to said workpiece support means, including an electrical power supply means for said electrically powered tool provided with first electrical contacts supported on said toolhead support means operatively engageable by second electrical contacts disposed on said electrically powered tool when said electrically powered tool is disposed in said predetermined operative position;

means operatively interconnecting said toolhead support means and said toolhead assembly for selectively, rotatably indexing said toolhead assembly about said given axis to position a selected one of said tools in said predetermined operative position; and a roller bearing having an inner race rigidly secured to said toolhead support means and an outer race rigidly secured to said toolhead assembly;

wherein said locking means includes an extendible pin disposed in said toolhead support means and a pin receiving opening in said bearing outer race, registrable with said extendible pin when said tool is disposed in said predetermined position.

40. A machine tool according to claim 39 wherein said engageable electrical contacts comprise knife-type contacts including a set of electrical contact clips supported on one of said toolhead support means and said electrically powered tool, and a set of electrical blade contacts disposed on the other of said toolhead support means and said electrically powered tool cooperable with said set of electrical contact clips.

41. A machine tool according to claim 39 including a rod member supported on said tool support means and disposed along said given axis, and wherein said first electrical contacts are disposed on said rod member.

42. A machine tool according to claim 41 wherein said electrical contacts comprise knife-type contacts including a set of electrical contact clips disposed on said rod member and a set of electrical blade contacts mounted on said electrically powered tool cooperable with said electrical contact clips.

43. A machine tool according to claim 40 wherein said toolhead assembly is displaceable longitudinally along a y-axis, transversely along an x-axis and vertically along a z-axis relative to workpiece support means.

44. A machine tool according to claim 39 including means for identifying a tool disposed in said predetermined operative position, and wherein said means for operating a selected one of said tools is operable to supply power to said selected tool disposed in said predetermined operative position responsive to an identifying signal of said identifying means.

45. A machine tool according to claim 39 including a pin disposed in one of said toolhead support means and said toolhead assembly, and a pin receiving opening in the other of said toolhead support means toolhead assembly, registrable with said pin when a selected one of said tools is disposed in said predetermined operative position, and means for selectively extending and retracting said pin into and out of said registered opening.

46. A machine tool according to claim 45 wherein said pin includes a tapered end portion engageable with a side wall portion of said opening for camming said tool into said predetermined operative position under conditions where said tool may not be precisely positioned in said predetermined operative position.

47. A machine tool according to claim 39 wherein said rotatably indexing means includes a friction drive.

48. A toolhead assembly for a machine tool comprising:
support means mountable on said machine tool;
a housing mounted on said support means, rotatable about a given axis relative to said support means;
at least two tools mounted on said housing, having axes radially disposed and circumferentially spaced relative to said given axes, at least one of said tools being electrically powered;
means for operating a selected one of said tools when said selected tool is disposed in a predetermined operative position relative to said support means, including an electrical supply means for said electrically powered tool provided with first electrical contacts supported on said support means and second electrical contacts mounted on said electrically powered tool operatively engageable with said first electrical contacts when said electrically powered tool is disposed in said predetermined operative position;
means operatively interconnecting said support means and said housing for selectively, rotatably indexing said housing about said given axis to position a selected one of said tools in said predetermined operative position; and
a roller bearing having an inner race rigidly secured to said support means and an outer race rigidly secured to said housing;
wherein said locking means includes an extendible pin disposed on said support means and a pin receiving opening disposed in said outer race, registrable with said extendible pin when said tool is disposed in said predetermined position.

49. A toolhead assembly according to claim 48 wherein said engageable electrical contacts comprise knife-type contacts including a set of electrical contact clips supported on one of said support means and said electrically powered tool, and a set of electrical blade contacts disposed on the other of said support means and said electrically powered tool cooperable with said set of electrical contact clips.

50. A toolhead assembly according to claim 48 including a rod member supported on said support means and disposed along said given axis, and wherein said first electrical contacts are disposed on said rod member.

51. A toolhead assembly according to claim 50 wherein said electrical contacts comprise knife-type contacts including a set of electrical contact clips disposed on said rod member and a set of electrical blade contacts mounted on said electrically powered tool cooperable with said electrical contact clips.

52. A toolhead assembly according to claim 48 including means for identifying a tool disposed in said predetermined operative position, and wherein said means for operating a selected one of said tools is operable to supply power to said selected tool disposed in said predetermined operative position responsive to an identifying signal of said identifying means.

53. A tool assembly according to claim 48 including a pin disposed in one of said support means and said housing, and a pin receiving opening in the other of said support means and housing, registrable with said pin when a selected one of said tools is disposed in said predetermined operative position, and means for selectively extending and retracting said pin into and out of said registered opening.

54. A machine tool according to claim 53 wherein said pin includes a tapered end portion engageable with a side wall portion of said opening for camming said tool into said predetermined operative position under conditions where said tool may not be precisely positioned in said predetermined operative position.

55. A toolhead assembly according to claim 48 wherein said rotatably indexing means includes a friction drive.

56. A machine tool comprising:
a base member;
a workpiece support means mounted on said base member;
a toolhead support means mounted on said base member;
a toolhead assembly mounted on said toolhead support means, rotatable about a given axis relative to said toolhead support means;
at least two tools mounted on said toolhead assembly, having axes radially disposed and circumferentially spaced relative to said given axes, at least one of said tools being air powered;
means for operating a selected one of said tools when said selected tool is disposed in a predetermined operative position relative to said workpiece support means, including means for supplying air under pressure to said air powered tool, said means for supplying air under pressure to said air powered tool including a rotary union assembly having a first stationary member supported on said support means and having an air passageway communicable with said source of air under pressure and communicating with an outlet port therein, a second member supported on said toolhead assembly for rotation therewith about said given axes, cooperating with said first stationary member to provide a chamber therebetween and having at least one passageway intercommunicating said chamber and an outlet port therein communicating with said air powered tool and a valve having a passageway therethrough disposed in said chamber, normally yieldingly biased into a first position closing said outlet port of said first member and displaceable to a second position by means of the impingement of air under pressure supplied to said passageway in said first member to allow the flow of pressurized air displacing said valve member through a portion of said chamber between said first member and said valve member, said passageway in said valve member and said passageway in said second member;
means operatively interconnecting said toolhead support means and said toolhead assembly for selectively, rotatably indexing said toolhead assembly about said given axes to position a selected one of said tools in said predetermined operative position; and a roller bearing having an inner race rigidly secured to said toolhead support means and an outer race rigidly secured to said toolhead assembly;

wherein said locking means includes an extendible pin disposed in said toolhead support means and a pin receiving opening in said bearing outer race, registrable with said extendible pin when said tool is disposed in said predetermined position.

57. A machine tool according to claim 56 wherein said toolhead assembly and said workpiece support means are displaceable relative to each other along a longitudinal or y-axis, a transverse or x-axis and a vertical or z-axis.

58. A machine tool according to claim 56 including means for identifying a tool disposed in said predetermined operative position, and wherein said means for operating a selected one of said tools is operable to supply power corresponding to the tool disposed in said predetermined operative position responsive to a predetermined signal derived from said identifying means.

59. A machine tool according to claim 56 including a locking pin disposed in one of said toolhead support means and said toolhead assembly, and a pin receiving opening in the other of said toolhead support means and said toolhead assembly, registrable with said locking pin when said selected tool is disposed in said predetermined operative position, and means for selectively extending and retracting said locking pin into and out of a registrable opening.

60. A machine tool according to claim 59 wherein said locking pin includes a tapered end portion engageable with a side wall portion of said opening for camming said tool into said predetermined operative position under conditions where said tool may not be precisely positioned in said predetermined operative position.

61. A machine tool according to claim 59 wherein said rotatably indexing means includes a friction drive.

62. A machine tool according to claim 30 wherein said drive pinion is provided with an outer layer of frictional material drivingly engageable with said cylindrical surface.

63. A machine tool according to claim 30 wherein at least one of said tools is electrically powered, and wherein said means for operating a selected one of said tools includes electrical contact means which engage when said electrically powered tool is disposed in said predetermined operative position.

64. A machine tool according to claim 30 wherein at least one of said tools is pneumatically powered, and wherein said means for operating a selected one of said tools includes means for communicating a source of air under pressure with said pneumatically powered tool when said tool is disposed in said predetermined operative position.

65. A machine tool according to claim 30 including means for identifying a tool disposed in said predetermined operative position, and wherein said means for operating a selected one of said tools is operable to supply power corresponding to the tool disposed in said predetermined operative position responsive to a predetermined signal derived from said identifying means.

66. A machine tool according to claim 30 including a locking pin disposed in one of said toolhead support means and said toolhead assembly, and a pin receiving opening in the other of said toolhead support means and said toolhead assembly, registrable with said locking pin when said tool is disposed in said predetermined operative position, and means for selectively extending and retracting said locking pin into and out of a registrable opening.

67. A machine tool according to claim 66 wherein said locking pin includes a tapered end portion engageable with a side wall portion of said opening for camming said tool into said predetermined operative position under conditions where said tool may not be precisely positioned in said predetermined operative position.

68. A machine tool according to claim 62 wherein said outer layer of frictional material drivingly engageable with said cylindrical surface comprises a polyurethane material.

69. A machine tool according to claim 67 wherein said means for extending and extracting said locking pin is operable to provide a greater retracting force than extending force.

* * * * *